United States Patent [19]

Takano et al.

[11] Patent Number: 5,742,701

[45] Date of Patent: Apr. 21, 1998

[54] ALIGNMENT DETECTION APPARATUS

[75] Inventors: Misuzu Takano, Hirakata; Kinji Horikami, Suita; Yoshihiro Itsuzaki, Kashihara; Masaya Nakao, Moriguchi, all of Japan

[73] Assignee: Matsushita Electric Industrial Co., Ltd., Osaka-fu, Japan

[21] Appl. No.: 389,233

[22] Filed: Feb. 15, 1995

[30] Foreign Application Priority Data

Feb. 15, 1994 [JP] Japan ................................. 6-018281
Feb. 15, 1994 [JP] Japan ................................. 6-018282

[51] Int. Cl.$^6$ ............................................... G06K 9/00
[52] U.S. Cl. ..................... 382/141; 382/151; 364/474.34; 348/95
[58] Field of Search ..................... 382/141, 144, 382/145, 146, 147, 148, 149, 150, 151; 364/474.28, 474.34; 348/86, 87, 94, 95; 356/399, 400, 401

[56] References Cited

U.S. PATENT DOCUMENTS

| | | | |
|---|---|---|---|
| 4,253,112 | 2/1981 | Doemens | 382/151 |
| 4,555,798 | 11/1985 | Broadbent, Jr. | 382/144 |
| 4,635,293 | 1/1987 | Watanabe | 382/130 |
| 4,643,579 | 2/1987 | Toriumi | 348/95 |
| 5,113,565 | 5/1992 | Cipolla | 382/151 |
| 5,446,801 | 8/1995 | Itsuzaki | 348/295 |

FOREIGN PATENT DOCUMENTS

6-243253  9/1994  Japan .

*Primary Examiner*—Dwayne Bost
*Assistant Examiner*—Brian L. Johnson
*Attorney, Agent, or Firm*—Wenderoth, Lind & Ponack

[57] ABSTRACT

An alignment detection apparatus is able to accurately detect the alignment condition of an upper hole and a lower hole located under the upper hole even when a scanning window does not precisely match either of the two holes. This alignment detection apparatus comprises an image producer which produces a digital density image indicative of these two holes. A position detector detects positions of the holes based on the digital image signal and produces a position signal. A displacement detector detects a distance between the upper hole and lower hole based on the position signal and produces a displacement signal indicative of the thus detected distance. Based on the displacement signal, the alignment condition of two holes including the information of how the lower hole edge is displaced from the upper hole edge can be detected.

12 Claims, 8 Drawing Sheets

ALIGNMENT DETECTION APPARATUS

BACKGROUND OF THE INVENTION

1. Field of the Invention

The present invention relates to an alignment detection apparatus used in the assembly process of a factory manufacturing line for visual recognition processing of image data obtained from target objects by an imaging means, and recognizing that such target objects are aligned within a permissible range, for use in such processes as pass/fail quality determination and positioning for equipment operation. The present invention is especially suitable for positioning machinery for screwing a screw into a screw hole through a hole opened in a plate placed over the screw hole.

2. Description of the Prior Art

Various position detection apparatuses for detecting the positions of objects based on the object image picked-up by the image pick-up device have been used recently as image recognition devices for automatic manufacturing lines such as for screwing a screw into a target screw hole. A conventional position detection apparatus for detecting the position of objects having circular shapes is described below.

Figure 14:
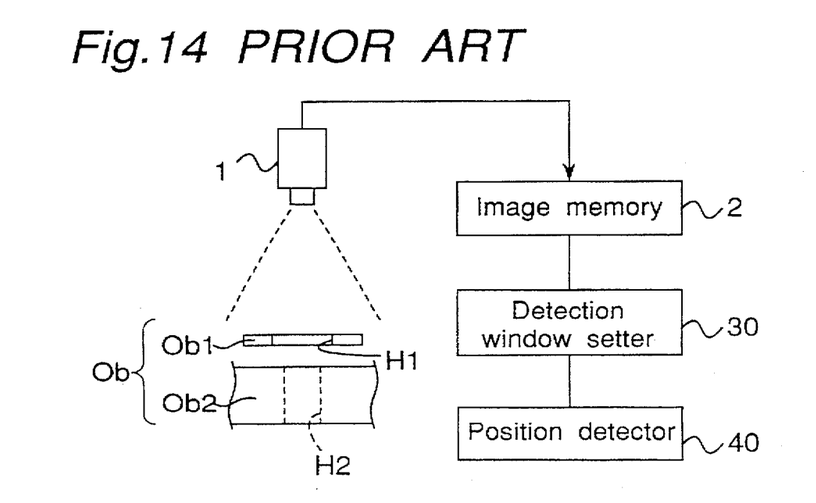
FIG. 14 is a block diagram showing an example of conventional alignment detection apparatus.

In FIG. 14, one example of conventional position detection apparatuses is shown. This position detection apparatus detects the center position of a circular subject. An image pick-up device 1 captures an image of objects 0b including first and second object members Ob1 and Ob2 placed under the first object member Ob1. The image pick-up device 1 outputs image density data representing the object image as the difference of density at each pixel. An image memory 2 stores the image density data output by the device 1. A detection window setter 30 is a means for setting a detection window. A position detector 40 scans the image density data by means of the detection window to detect the position of the object.

The principle of detecting the position of a circular target object and the center thereof by means of a window shaped similarly to the contour lines of that object is briefly described. As typically shown in FIG. 6, a contour line-shaped window Dw has a shape conforming to the contour line of a reference image of the circular target object. Line windows Lw Used for density difference detection are placed in, and intersects the circular window Dw. The line windows Lw are able to separately detect the difference in image density data on the outside and inside of the circular window Dw.

Figure 6:
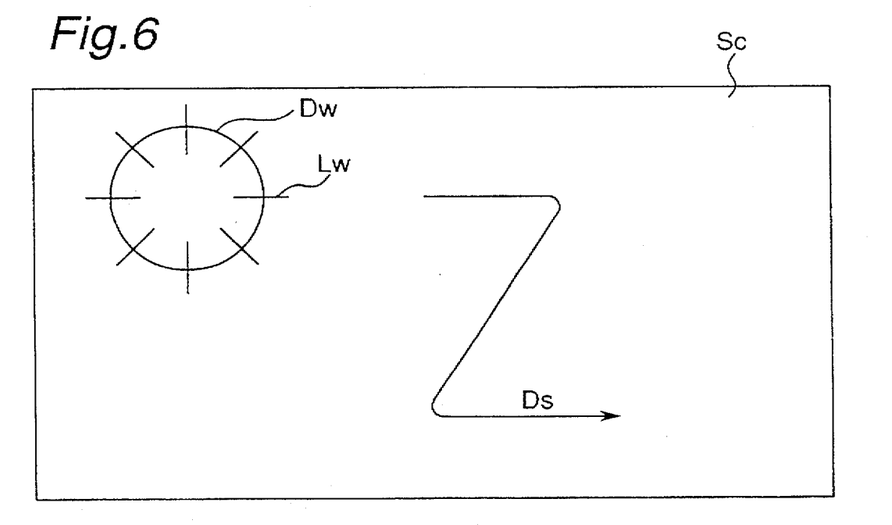
FIG. 6 is an illustration in assistance of explaining a position detecting method using a circular detection window according to the present invention.

The position detector 40 determines the image density difference between the outside and inside at each scanning position, and compare it with an image data threshold value. The position of the circular window Dw where the number of line windows Lw at which the detected image density difference exceeds the threshold value is greatest is determined to be the image position of the circular target object.

Figure 9:
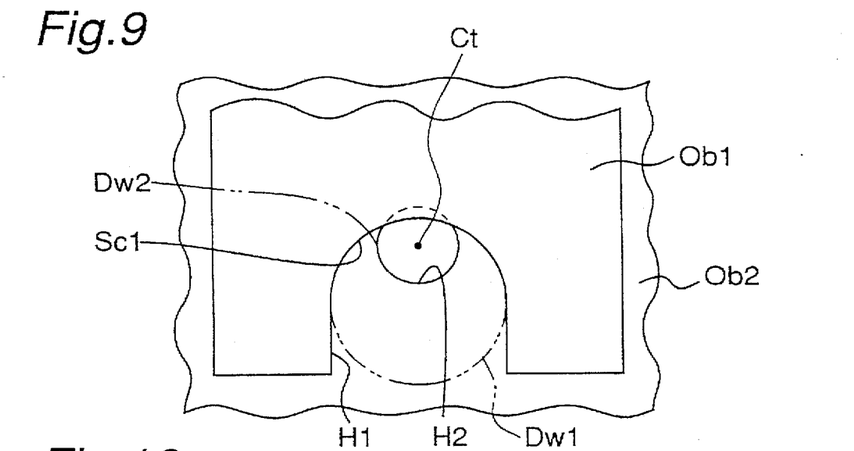
FIG. 9 is a top view of the objects Ob, wherein a target hole H2 is shown through under an open hole.

However, according to the conventional position detection apparatus, it is impossible to detect the position and pose of a non-circular shape object. Specifically, if the target object is formed to have a partially non-circularly shaped part, such an object can not be detected properly including the accurate position and pose thereof. Therefore, when the first object member Ob1 has a hole H1 configured in a non-circular shape and the second object member Ob2 has a circular hole H2 which is not aligned with the hole H1, as shown in FIG. 9, the screw is screwed in accordance with the detected position of the hole H2 regardless of whether the lower hole H2 is partially covered by the circumference of the upper hole H1, or not, causing the screw and hole to be damaged.

SUMMARY OF THE INVENTION

The present invention has been developed with a view to substantially solving the above described disadvantages and has for its essential object to provide an improved alignment detection apparatus.

In order to achieve the aforementioned objective, an alignment detection apparatus for detecting the alignment condition of first and second objects comprises a digital image signal producing means for producing a digital image signal indicative of the image of the first and second objects; a position detecting means for detecting positions of the first and second objects based on the digital image signal to produce a position signal indicative of the detected positions; and an alignment detection means for detecting a distance between the first and second objects based on the position signal to produce a displacement signal indicative of the detected distance.

BRIEF DESCRIPTION OF THE DRAWINGS

These and other objects and features of the present invention will become clear from the following description taken in conjunction with the preferred embodiments thereof with reference to the accompanying drawings through out which like parts are designated by like reference numerals, and in which.

DETAILED DESCRIPTION OF THE PREFERRED EMBODIMENTS

Figure 1:
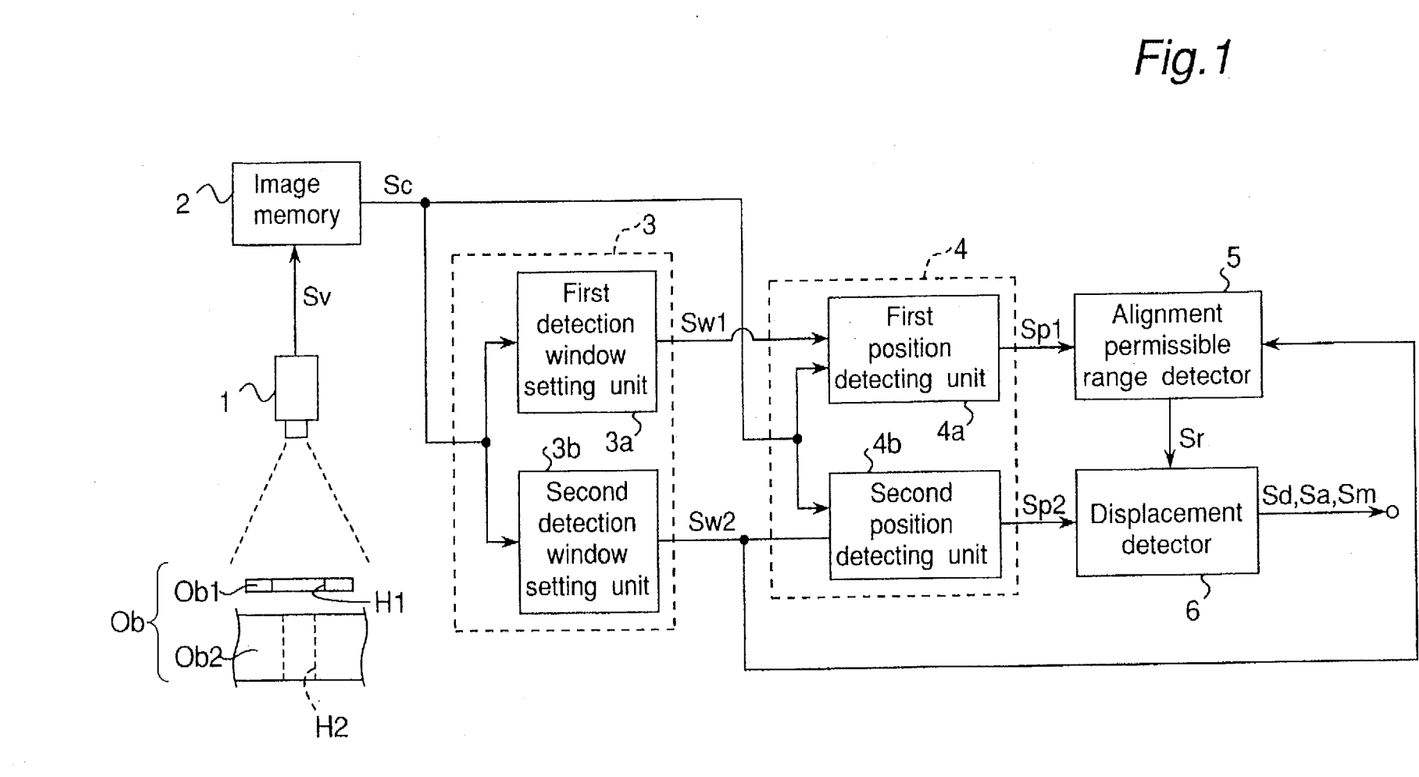
FIG. 1 is a block diagram showing an alignment detection apparatus according to the present invention.

Referring to FIG. 1, an alignment detection apparatus according to the present invention used for detecting the condition of objects Ob being aligned with each other is shown. The objects Ob include a first object member Ob1 and a second object member Ob2 placed under the first object member Ob1. As best shown in FIG. 9, first object member Ob1 has an open hole H1 configured in an arched shape defined by an arch or semi-circular part Sc1 and two sides extending from the arch ends toward the outside. The second object member Ob2 has a closed hole H2 configured in a circular shape, substantially a circle having a center Ct. The second hole H2 is formed for receiving a mating member therein passing through the first opening H1, and is preferably, but not limited to, a smaller opening than the first opening H1.

Referring back to FIG. 1, the alignment detection apparatus includes an image producer 1, an image memory 2, a detection window setter 3, a position detector 4, an alignment permissible range detector 5, and a displacement detector 6. The image producer 1 is comprised of a television camera or similar visual sensor, and captures the image of object 0b including the information of the alignment condition of both holes H1 and H2. The image producer 1 digitizes the resulting image data and outputs it as a video image signal Sv.

The image memory 2 stores the video image signal Sv. The detection window setter 3 is connected to the image memory 2 for receiving an image data signal Sc containing the coordinate data of pixels representing object members Ob1 and Ob2 therefrom. The detection window setter 3 is an input/output device such as a light pen system by which the operator can set a detection window Dw matching the shape or contour of the target image (object) to detect by designating points on the screen surface thereof with a light pen. Based on the thus designated points, the detection window setter 3 produces a window signal Sw indicative of the thus set detection window Dw. According to this embodiment, the detection window Dw configured in a circular shape is used.

The detection window setter 3 includes a first window setting unit 3a for setting a first detection window Dw1, configured in a circular shape matching the semi-circular part Sc1 of first hole H1, based on the signal Sc to produce a first window signal Sw1. The detection window setter 3 further includes a second window setting unit 3b for similarly setting a second detection window Dw2, configured in a circular shape for matching the second hole H2, to produce a second window signal Sw2. The detection windows Dw1 and Dw2 are typically shown in FIG. 9 wherein the window Dw2 is superimposed on the hole H2.

The position detector 4 is connected to the image memory 2 and the detection window setter 3 for receiving the image data signal Sc and the window signal Sw, respectively, therefrom. The position detector 4 scans the image data in the memory 2 (signal Sc) by a means of detection window Dw (signal Sw) to detect the object's position.

Figure 7:
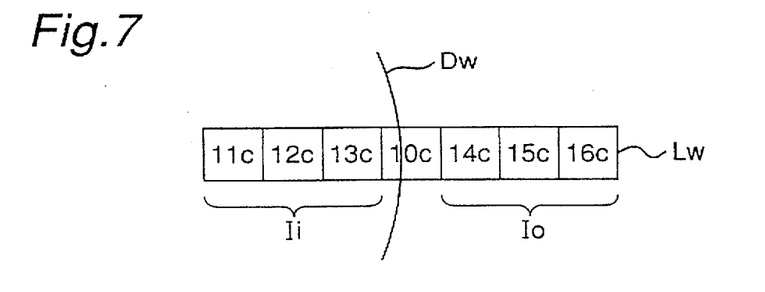
FIG. 7 is an illustration in assistance of explaining the radial sampling line windows according to the present invention.
Figure 8:
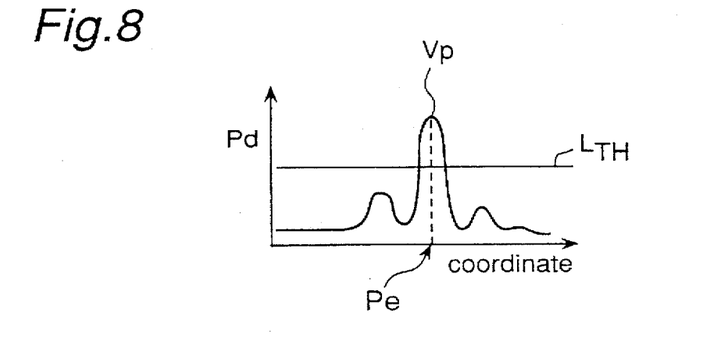
FIGS. 8 is an illustration in assistance of explaining the detection of an edge point of an object shape according to the present invention.

With reference to FIGS. 6, 7, and 8, the principal of position detection according to the present invention is described. The detection window Dw is a contour line-shaped window of which the shape and size conform to at least a part of the contour line of the target object image. A plurality of line windows Lw used for density difference detection are placed intersecting the outside edge of the circular window Dw.

In FIG. 7, one of line window Lw is shown. Each line window Lw is comprised of, for example, seven density detection cells 11c, 12c, 13c, 10c, 14c, 15c, and 16c which are arranged in order from the inside to the outside so as to intersect the detection windows Dw at the middle cell 10c. The line window Lw is thus able to detect an inside image density Ii and an outside image density Io in the area of outside and inside thereof, respectively.

In FIG. 8, the density Pd at each cell of line window Lw is schematically shown. The density Pd shows a peak density Vp greater than a predetermined threshold level $L_{TH}$ at position Pe which is detected as an edge point.

The position detector 4 scans the image stored in the image memory 2 using this circular window Dw. During this scanning operation, the line windows Lw detect the outside image data Io by a group of cells 14c, 15c, and 16c and the inside image Ii data by a group of cells 11c, 12c, and 13, respectively. The image density difference between the outside image data Io and inside image data Ii is determined at each scanning position, and compared with an image data threshold value $L_{TH}$. The position of the circular window Dw where the number of line windows Lw at which the detected image density difference exceeds the threshold value at the middle cell 10c is greatest is determined to be the position of the target object.

The position detector 4 detects the target image which is partially or entirely configured in a circular shape utilizing the equation of a circle based on the edge points which represent the accurate contour positions. The detector 4, then, obtains the center point of the detected target image. Thus, the detector 4 detects the position at which the detection window Dw matches the contour of target image, and outputs a position signal Sp containing coordinate data of the detected object. The above described position detecting method using a circular window can be conveniently conducted using an apparatus such as disclosed in Japanese Laid-open Patent Publication No. H6-243253 published Sep. 2, 1994, assigned to the same assignee of the present application, the teachings of which are hereby incorporated by reference.

The position detector 4 includes a first position detection unit 4a connected to the image memory 2 and the first detection window setting unit 3a for receiving the signals Sc and Sw1 therefrom, respectively. The first position detection unit 4a detects the position where the first detection window Dw1 matches the arch portion Sc1 of the first hole H1 based on the signals Sc and Sw1, and produces a first position signal Sp1.

The position detector 4 further includes a second position detection unit 4b connected to the image memory 2 and the second detection window setting unit 3b for receiving the signals Sc and Sw2 therefrom, respectively. The second position detection unit 4b detects the position where the detection window Dw2 matches substantially the entire portion of second hole H2 and produces a second position signal Sp2.

The alignment permissible range detector 5 is connected to the second detection window detection unit 3b and the first position detector 4a for receiving the second window signal Sw2 and the first position signal Sp1, respectively. The alignment permissible range detector 5 finally detects the position of the whole portion of the first hole H1 based on the signal Sp1 indicative of the arched part Sc1 of hole H1 and the data of the entire shape of hole H1 stored therein.

Figure 10:
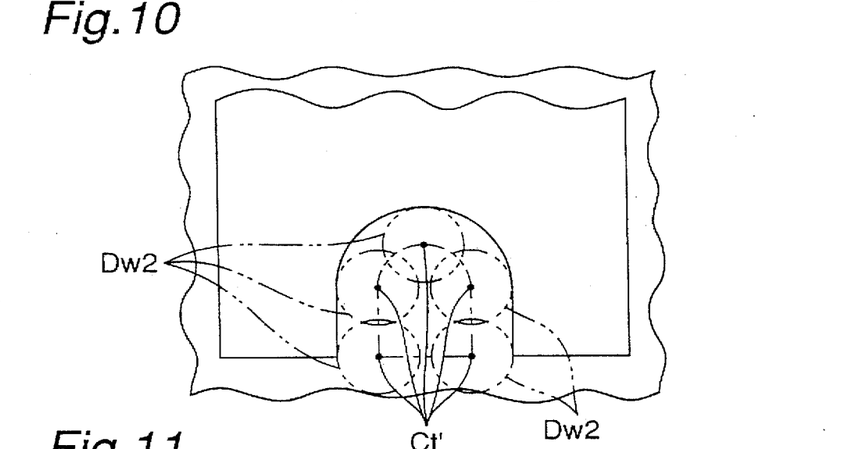
FIG. 10 is an illustration in assistance of explaining a method for detecting an alignment permissible range according to the present invention.

The detector 5 scans the data area inside the first hole H1 thus detected therein by a means of the second window Dw2 (signal Sw2) to determine the center Ct' of window Dw2 being circumscribed with the first hole H1, as schematically shown in FIG. 10. A set of coordinates (X, Y) of thus determined center Ct' represents a boundary Lr which can define an area R within the first hole H1.

When a center of solid member such as a bar or a tube having a cross section not greater than the second hole H2 is located within this area R, such solid member can be placed in the second hole H2 through the first hole H1 without being hampered by the first object Ob1. In this sense, this area R is defined as an alignment permissible range R where the holes H1 and H2 are aligned with each other for free insertion of such a member into the hole H2. Then, detector 5 produces a range signal Sr containing a set of coordinates (Xr, Yr) of dots included within the area R. Note that the alignment permissible range detector 5 can be connected to the second position detecting unit 4b instead of the second detection window setting unit 3b, so that the permissible range R is determined by scanning the hole H1 with the second hole H2 (signal Sp2) instead of the detection window Dw2 (sw2).

Figure 11:
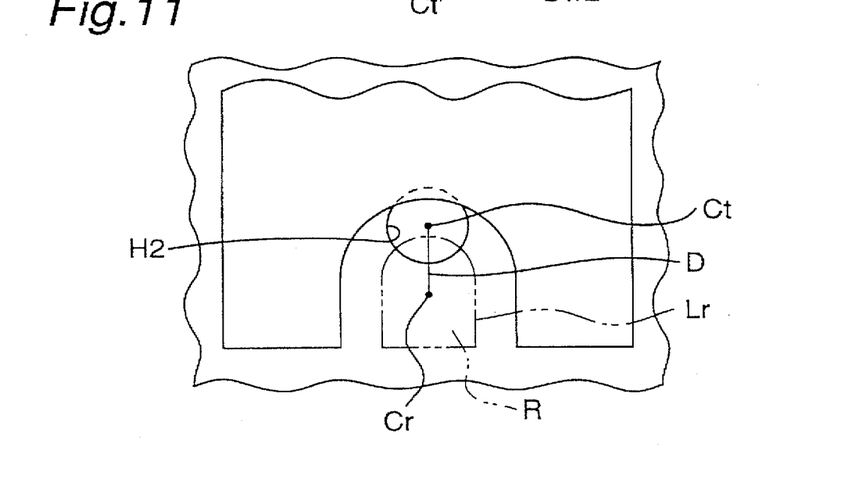
FIG. 11 is an illustration in assistance of explaining a method for detecting an alignment condition according to the present invention.

The displacement detector 6 is connected to the second position detection unit 4b and the alignment permissible range detector 5 for receiving the signal Sp2 and the range signal Sr therefrom, respectively. The displacement detector 6 detects a displacement D which is a distance between the center Ct of the detected hole H2 and a center of thus determined permissible range R, as schematically shown in FIG. 11. Note that this displacement D represents how much the hole H2 is displaced from or aligned with the permissible range R. Then, the detector 6 produces a displacement signal Sd indicative of thus detected distance D.

Furthermore, the displacement detector 6 compares the coordinates of dots contained within the detected second hole H2 with those of the alignment permissible range R to judge whether the second hole H2 is located within the range area R or not. Based on the judging result, the detector 6 produces an alignment signal Sa when the holes H1 and H2 are aligned, and a mis-alignment signal Sm when the holes H1 and H2 are not aligned.

Figure 2:
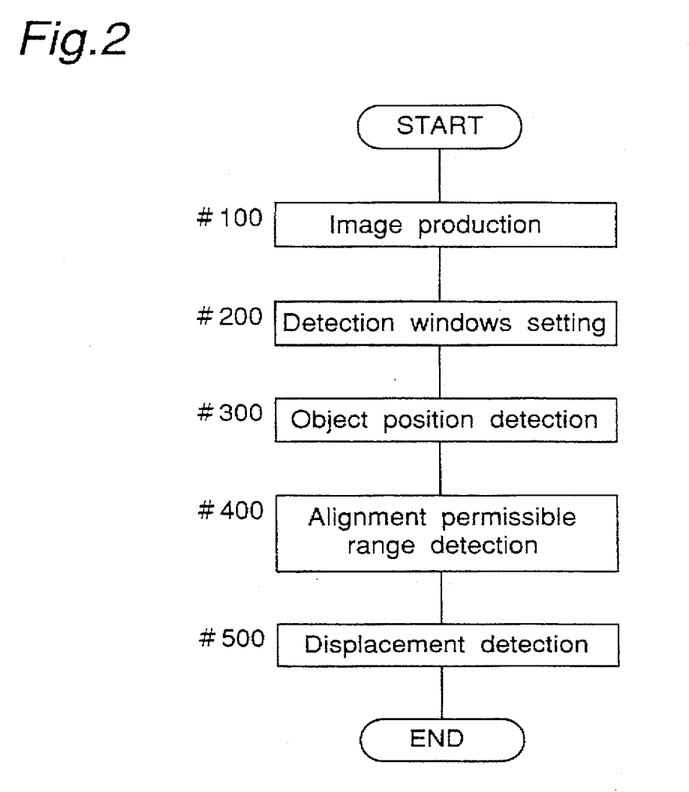
FIG. 2 is a flow chart showing the main routine of the alignment detection apparatus of FIG. 1.

Referring to FIG. 2, the main routine of operation performed by the alignment detection apparatus of FIG. 1 is shown.

At step #100 titled as "Image production", the image producer 1 captures an image of the object Ob, and outputs the video image signal Sv to the image memory 2.

At step #200 titled as "Detection windows setting", the first and second detection windows Dw1 and Dw2 are set by the detection window setter 3.

At step #300 titled as "Object Position detection", the position detector 4 scans the image data signal Sc by means of the circular windows Dw1 (signal Sw1) and Dw2 (Sw2) so as to detect the positions where windows Dw1 and DW2 match the target objects Ob1 and Ob2, respectively, as previously described with reference to FIG. 9.

At step #400 titled as "Alignment permissible range detection", the alignment permissible range R is detected by the alignment permissible range detector 5 in a manner described above.

At step #500 titled as "Displacement detection", the displacement detector 6 detects the distance D, and then produces the displacement signal Sd, alignment signal Sa, and mis-alignment signal Sm. It is to be noted that the operation described above with respect to the routines #300 and #400 may be performed by means of software programmed in a micro computer.

Figure 3:
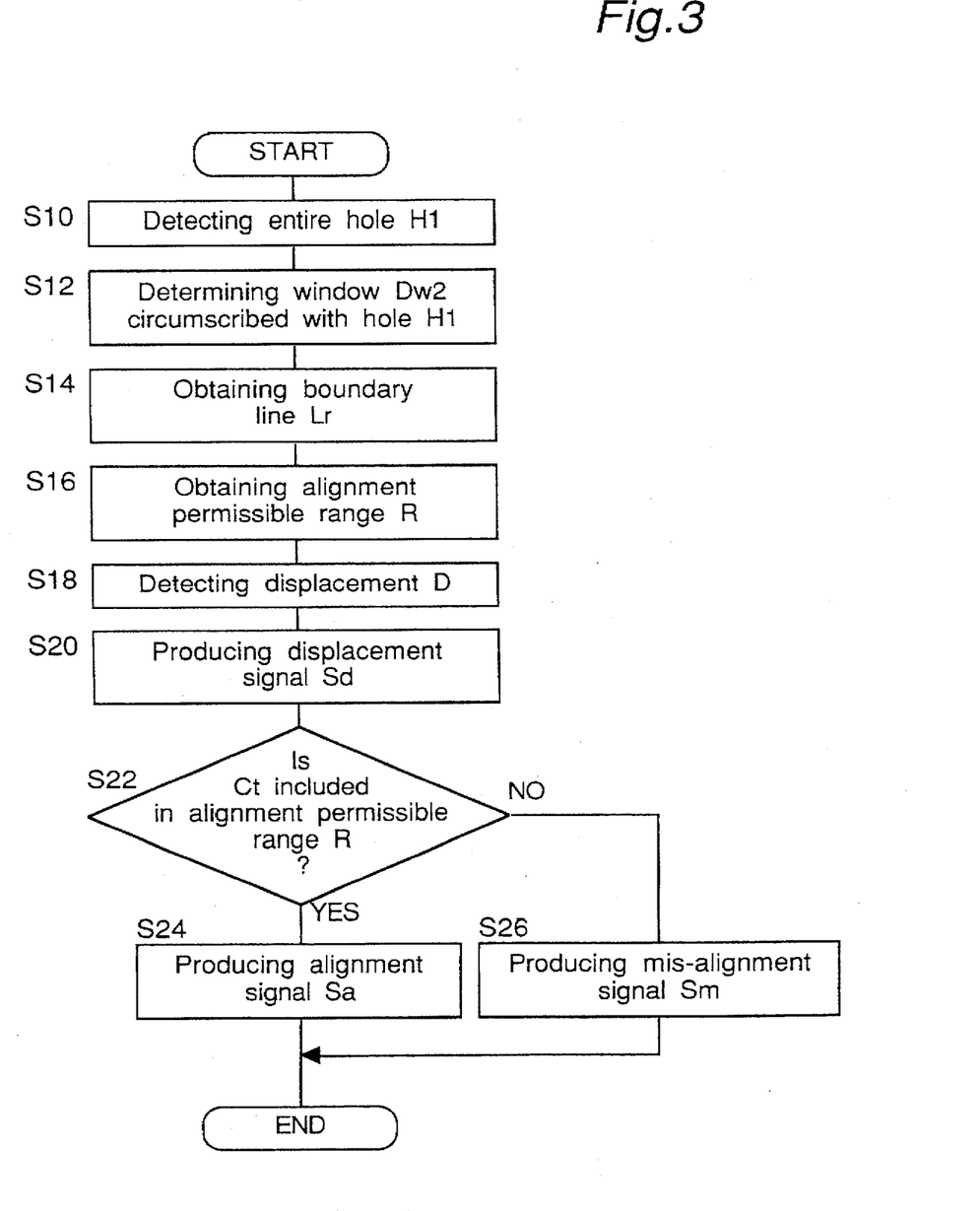
FIG. 3 is a flow chart showing the operation of alignment permissible range detection and displacement detection steps of FIG. 2.

With reference to FIG. 3, the operations for alignment permissible range detection and displacement detection performed in steps #300 and #400 are described below.

At step S10, based on thus detected position of the arch portion Sc1 and the data indicative of the shape of first hole Hi previously stored in the alignment permissible range detector 5, the position of first hole H1 is entirely detected.

At step S12, the alignment permissible range detector 5 scans the data area inside the first hole H1 detected at step S10 by a means of the second window Dw 2 (signal Sw2) so as to determine the positions where a circle corresponding to the second window DW can be circumscribed with the first hole H1. The coordinates (X, Y) of dots representing the centers Ct' of circumscribing circles are obtained.

At step S14, the boundary line Lr serially connecting dots Ct' is obtained inside the detected first hole H1 area.

At step S16, an area enclosed by the boundary line Lr is determined as the alignment permissible range R which can be expressed by a set of coordinates R(Xr, Yr) of dots confined by the boundary line Lr.

At step S18, the displacement D is calculated.

At step S20, the displacement signal Sd indicative of the distance detected at step S20 is produced based on the displacement D detected at step S18.

At step S22, it is judged whether the center Ct is included in the alignment permissible area R or not. In other words, it is judged whether the coordinates (Xt, Yt) of center Ct is included in the set of coordinates R(Xr, Yr), as expressed by the following equation, $$Ct(Xt, Yt) \in R(Xr, Yr) \qquad (1).$$

When it is judged "YES" meaning that the center C2 is within the range R, the procedure advances to step S24.

At step S24, the alignment signal Sa indicating that the second hole H2 is aligned with the first hole H1 is produced. Then the procedure terminates.

However, when it is judged "NO" at step S22, the procedure advances to step S26.

At step S26, the alignment signal Sm indicative of that the second hole H2 is not aligned with the first hole H1 is produced. Then, the procedure terminates.

Figure 4:
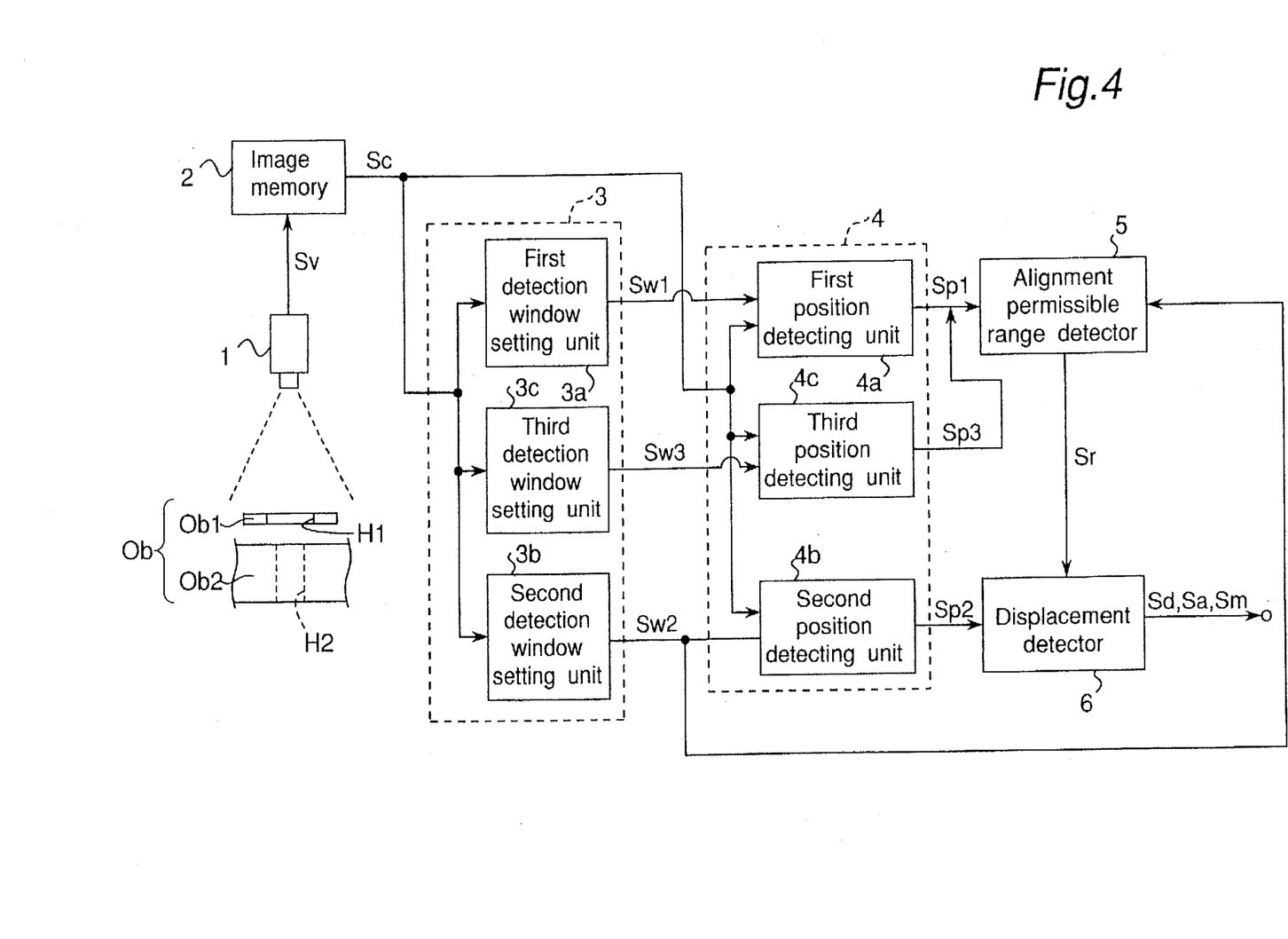
FIG. 4 is a block diagram showing an alternative of the alignment detection apparatus of FIG. 1.
Figure 12:
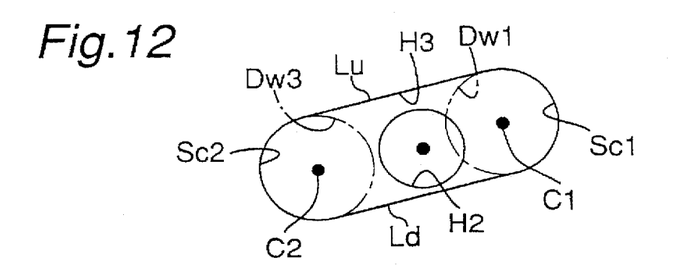
FIG. 12 is a top view of the objects Ob, wherein the target hole H2 is shown through under a closed long open hole H3.

Referring to FIG. 4, an alternative of the alignment detection apparatus of FIG. 1 used for the detection of the alignment condition of objects Ob shown in FIG. 12, wherein only holes formed in the objects Ob1 and Ob2 are shown for the sake of brevity. The first object member Ob1 has an elongated closed hole H3 defined by first and second semi-circles Sc1 and Sc2 opposed to each other and two sides Lu and Ld connecting these semi-circles Sc1 and Sc2. The semi-circles Sc1 and Sc2 have centers C1 and C2. The second object member Ob2 has the hole H2 configured in the same shape as that shown in FIG. 9.

As shown in FIG. 4, the first detection window setter 3 of this alternative embodiment is further provided with a third detection window setting unit 3c connected to the image memory 2 for setting a third detection window Dw3 to produce a third window signal Sw3. The first and third detection windows Dw1 and Dw3 are set to match the first and second semi-circular parts Sc1 and Sc2, respectively, for example.

The position detector 4 is further provided with a third position detecting unit 4c connected to the image memory 2 and the third detection window setting unit 3c for receiving the image signal Sc and the third window signal Sw3, respectively, therefrom, and is further connected to the alignment permissible range detector 5. The third position detecting unit 4c detects the second semi-circular part Sc2 and outputs a third position signal Sp3 to the alignment permissible range detector 5, while the first detection window setting unit 3a detects the first semi-circular part Sc1 as described above.

The constructed alignment detection apparatus according to this embodiment performs in a manner very similar to that described with reference to FIGS. 2 and 3. However, it is also possible to construct the alignment detection apparatus of FIG. 4 to perform the operations of alignment permissible range detection and displacement detection as described below.

Figure 5:
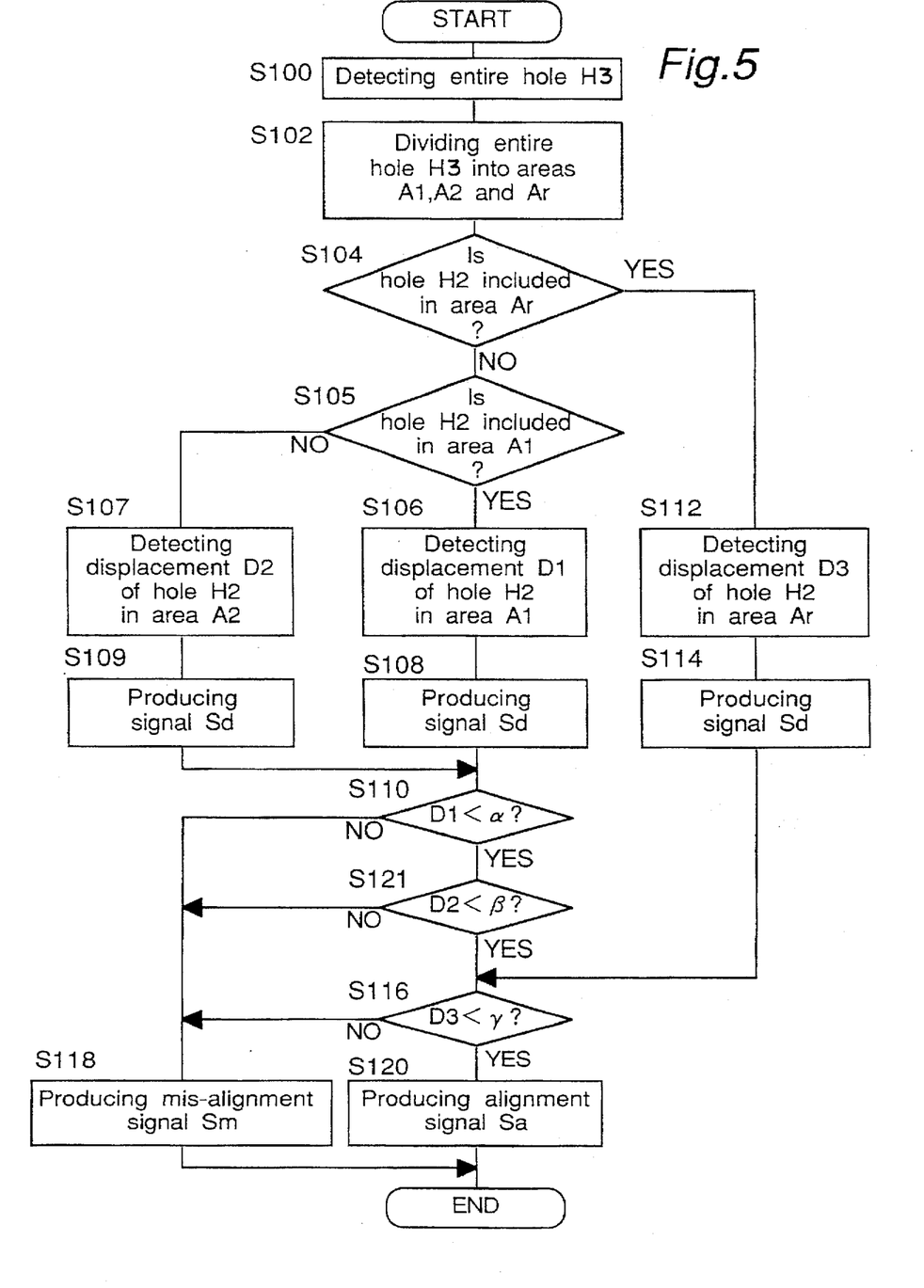
FIG. 5 is a flow chart showing an operation of alignment permissible range detection and displacement detection steps performed by the alignment detection apparatus of FIG. 4.

Referring to FIG. 5, other operations for alignment permissible range detection and displacement detection performed in steps #300 and #400 are shown.

At step S100, the alignment permissible range detector 5 detects the entire hole H3 based on the first and second semi-circular parts Sc1 and Sc2 detected by the first and third detection windows Dw1 and Dw3, respectively, and the shape data of hole H3 previously stored therein.

Figure 13:
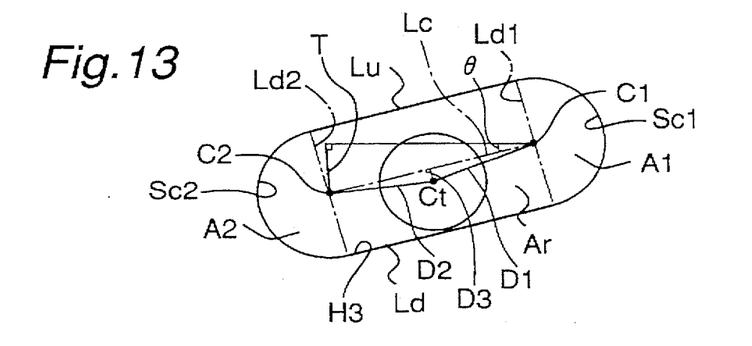
FIG. 13 is an illustration in assistance of explaining a method for detecting the alignment permissible range in the objects Ob shown in FIG. 12.

At step S102, the area of detected hole H3 is divided into semi-circular areas A1 and A2 and a rectangular area Ar by two diametral lines Ld1 and Ld2 connecting the open ends of semi-circular parts Sc1 and Sc2, respectively, as schematically shown in FIG. FIG. 13.

At step S104, it is judged whether the detected hole H2 is included in the rectangular area Ar, or not, utilizing the following equation of $$Ct \, (Xt, \, Yt) \in Ar(Xar, \, Yar) \quad (2),$$

wherein the Ar(Xar, Yar) represents a set of coordinates (Xar, Yar) of dots included in the area Ar. When this equation (2) is satisfied, it is judged the hole H2 is included in the area Ar. Then, the procedure advances to step S112.

At step S112, a displacement D3 which is a distance between the center point Ct and a center line Lc, as typically shown in FIG. 13, connecting center points C1 and C2 is calculated based on the following equation.

$$D3 = \frac{|\theta Xt - Yt + T|}{\sqrt{\theta^2 + (-1)^2}} \quad (3)$$

Then, the procedure advances to step S114.

At step S114, the displacement signal Sd is produced based on the distance D3. Then the procedure advances to step S116.

At step S116, it is judged whether the displacement D3 is less than a predetermined distance γ, or not. The distance γ is a value to be suitably determined in consideration of the diameters of hole H2 and the member to be placed inside the hole H2 and the size of rectangular area Ar. When it is judged "NO", meaning that the target hole H2 is out of the permissible range formed within the rectangular part Ar, then the procedure advances to step S118.

At step S118, the mis-alignment signal Sm is produced, and then the procedure terminates.

However, at step S116, when it is judged "YES", meaning that the target hole H2 is aligned with the hole H3, then the procedure advances to step S120.

At step S120, the alignment signal Sa is produced, and then the procedure terminates.

However, When it is judged "NO" at step S104, the procedure advances to step S105.

At step S105, it is judged whether the detected hole H2 is included in the semi-circular area A1, or not, utilizing the following equation of $$(Xt, \, Yt) \in A1(Xa, \, Ya) \quad (4),$$

wherein A1(Xa, Ya) represents a set of coordinate (Xa, Ya) of dots included in the area A1. When this equation is not satisfied, it is judged the hole H2 is included in the area A2. In this case, the following equation of $$(Xt, \, Yt) \in A2(Xb, \, Yb) \quad (5),$$

wherein A2(Xb, Yb) represents a set of coordinates (Xb, Yb) of dots included in the area A2, is satisfied. Then, the procedure advances to step S107.

At step S107, a displacement D2 which is a distance between the centers Ct and C2, as typically shown in FIG. 13, is calculated based on the following equation.

$$D2 = \sqrt{(Xt - Xb)^2 + (Yt - Yb)^2} \quad (6)$$

At step S109, the displacement signal Sd is produced based on the displacement D2. Then, the procedure advances to step S121 through step S110 wherein it is judged whether the displacement D1 is less than a predetermined distance α, or not. Note that the distance D1 is not detected when it is judged "NO" at step S105.

At step S121, it is judged whether the displacement D2 is less than a predetermined distance β, or not. It is to be noted that the distance β is a value to be suitably determined in consideration of the diameters of hole H2, the member to be placed inside the hole H2, and the semi-circle Sc2.

When it is judged "NO" meaning that the hole H2 is not aligned with the semi-circle area A2, the procedure advances to step S118 where the mis-alignment signal Sm is produced.

When it is judged "YES" meaning that the hole H2 is aligned with the area A2, the procedure advances to step S120 through step S116. Note that the predetermined distance D3 has no value, because the procedure does not execute the operation at step S112 when it is judged "NO" at step S104.

However, when it is judged "YES" at step S105 meaning that the hole H2 is included in the area A1, the procedure advances to step S106.

At step S106, the displacement D1 which is a distance between the center points Ct and C1, as typically shown in FIG. 13, is calculated based on the following equation.

$$D1 = \sqrt{(Xt - Xa)^2 + (Yt - Ya)^2} \quad (7)$$

At step S108, the displacement signal Sd is produced based on the displacement D1. Then the procedure advances to step S110.

At step S110, it is judged whether the displacement D1 is less than a predetermined distance α, or not. It is to be noted that the distance α is a value to be suitably determined in consideration of the diameters of hole H2, the member to be placed inside the hole H2, and the semi-circle Sc1.

When it is judged "NO", meaning that the target hole H2 is out of the permissible range, then the procedure advances to step S118.

When it is judged "YES", the procedure advances to step S120 through steps S121 and S116. Note the distances D2 and D3 are not detected when it is judged "YES" at each of steps S104 and S105.

It is to be noted that the third detection window setting unit 3c and third position detecting unit 4c can be omitted when the both semi-circular part Sc1 and Sc2 are formed by a part of the same circle.

AS apparent from the above, according to the present invention, it is possible to detect the position and pose of the object even if the object is formed in a partially non-circular shape such as an arched open hole or an elongated slot defined by semi-circular ends opposed to each other. Furthermore, the alignment condition of the two object holes including the information of how the lower hole edge is displaced from the upper hole edge. Therefore, a bolt or screw can be inserted in the target hole without being hampered by the upper hole edge, when an alignment detection apparatus according to the present invention is applied to machining equipment such as a screwing machine used in an automatic manufacturing line.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An alignment detection apparatus for detecting the alignment condition of first and second objects, comprising:

a digital image signal producing means for producing a digital image signal indicative of images of the first and second objects;

a position detecting means for detecting positions of the first and second objects by scanning the digital image signal through a first detection window configured in a shape which matches at least a part of an outline of the first object and a second detection window configured in a shape which matches at least a part of an outline of the second object, to produce a position signal indicative of the detected positions; and a displacement detection means for detecting a distance between the first and second objects based on the position signal to produce a displacement signal indicative of the detected distance;

wherein said position detecting means determines the positions of the first and second objects when a number of locations where the detection windows overlap the outlines of the first and second objects exceeds a predetermined number.

2. An alignment detection apparatus as claimed in claim 1, further comprising a memory means for storing the digital image signal therein.

3. An alignment detection apparatus as claimed in claim 1, further comprising an alignment condition judging means for judging whether the first and second objects are aligned with each other, or not, based on the displacement signal.

4. An alignment detection apparatus as claimed in claim 3, wherein said alignment condition judging means comprises an alignment judging means for judging whether the second object is entirely included within the first object, or not.

5. An alignment detection apparatus as claimed in claim 4, wherein said alignment condition judging means comprises an alignment signal producing means for producing an alignment signal when the second object is entirely included within the first object.

6. An alignment detection apparatus as claimed in claim 4, wherein said alignment condition judging means comprises a mis-alignment signal producing means for producing an alignment signal when the second object is not entirely included within said first object.

7. An alignment detection apparatus as claimed in claim 1, further comprising a scanning window setting means for setting said detection windows for scanning the digital image signal therewith.

8. An alignment detection apparatus as claimed in claim 7, wherein said scanning window setting means comprises:

a first scanning window setting means for setting said first detection window conforming to the first object; and a second scanning window setting means for setting said second detection window conforming to the second object.

9. An alignment detection apparatus as claimed in claim 8, wherein said position detection means comprises:

a first position detection means for detecting a position where said first detection window matches the first object to produce a first position signal; and a second position detection means for detecting a position where said second detection window matches said second object to produce a second position signal.

10. An alignment detection apparatus for detecting the alignment condition of first and second objects comprising:

a digital image signal producing means for producing a digital image signal indicative of images of the first and second objects;

a first scanning window setting means for setting a first detection window conforming to a first portion of the first object;

a second scanning window setting means for setting a second detection window conforming to a second portion of the first object;

a third scanning window setting means for setting a third detection window conforming to the second object;

a position detecting means for detecting positions of the first and second objects by scanning the digital image signal through the detection windows to produce a position signal indicative of the detected positions; and a displacement detection means for detecting a distance between the first and second objects based on the position signal to produce a displacement signal indicative of the detected distance.

11. An alignment detection apparatus as claimed in claim 10, wherein said position detection means comprises:

a first position detection means for detecting a position where the first scanning window matches the first portion of the first object to produce a first position signal;

a second position detection means for detecting a position where the second scanning window matches the second portion of the first object to produce a second position signal; and a third position detection means for detecting a position where the third scanning window matches the second object to produce a third position signal.

12. An alignment detection apparatus as claimed in claim 11, wherein said position detection means detects the position of the entire first object based on said first and second position signals.

* * * * *

UNITED STATES PATENT AND TRADEMARK OFFICE
CERTIFICATE OF CORRECTION

PATENT NO. : 5,742,701
DATED : April 21, 1998
INVENTOR(S) : Misuzu TAKANO et al.

It is certified that error appears in the above-indentified patent and that said Letters Patent is hereby corrected as shown below:

On the title page, item [75]:

Change the last name of the first named inventor from "TAKANO" to --YOKOMAE--.

Signed and Sealed this

Third Day of November, 1998

*Attest:*

BRUCE LEHMAN

*Attesting Officer*  Commissioner of Patents and Trademarks